United States Patent [19]

Kaun

[11] Patent Number: 4,540,642

[45] Date of Patent: Sep. 10, 1985

[54] CELL DESIGN FOR LITHIUM ALLOY/METAL SULFIDE BATTERY

[75] Inventor: Thomas D. Kaun, New Lennox, Ill.

[73] Assignee: The United States of America as represented by the United States Department of Energy, Washington, D.C.

[21] Appl. No.: 595,203

[22] Filed: Mar. 30, 1984

[51] Int. Cl.³ .............................................. H01M 2/14
[52] U.S. Cl. ..................................... 429/131; 429/103; 429/112; 429/221
[58] Field of Search ............... 429/102, 103, 131, 221, 429/112

[56] References Cited

U.S. PATENT DOCUMENTS

| | | | |
|---|---|---|---|
| 4,313,259 | 2/1982 | Kaun et al. | 429/112 X |
| 4,360,574 | 11/1982 | Park | 429/103 X |
| 4,386,019 | 5/1983 | Kaun et al. | 429/103 X |
| 4,411,968 | 10/1983 | Reiser et al. | 429/41 |

Primary Examiner—Charles F. LeFevour
Attorney, Agent, or Firm—Charles F. Lind; Hugh W. Glenn; Judson R. Hightower

[57] ABSTRACT

The disclosed lithium alloy/iron sulfide cell design provides loop-like positive and negative sheet metal current collectors electrically insulated from one another by separator means, the positive collector being located outwardly of the negative collector. The collectors are initially secured within an open-ended cell housing, which allows for collector pretesting for electrical shorts prior to adding any electrode materials and/or electrolyte to the cell. Separate chambers are defined outwardly of the positive collector and inwardly of the negative collector open respectively in opposite directions toward the open ends of the cell housing; and positive and negative electrode materials can be extruded into these respective chambers via the opposite open housing ends. The chambers and cell housing ends can then be sealed closed. A cross wall structurally reinforces the cell housing and also thereby defines two cavities, and paired positive and negative collectors are disposed in each cavity and electrically connected in parallel. The cell design provides for a high specific energy output and improved operating life in that any charge-discharge cycle swelling of the positive electrode material will be inwardly against only the positive collector to minimize shorts caused by the collectors shifting relative to one another.

11 Claims, 6 Drawing Figures 4,540,642

CELL DESIGN FOR LITHIUM ALLOY/METAL SULFIDE BATTERY

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

Lithium alloy/iron sulfide batteries, currently under development, have positive and negative electrode materials confined by or relative to structural positive and negative current collectors, which are electrically insulated from one another by separators. Typically, the negative electrode material is a lithium alloy (generally LiAl), the positive electrode material is an iron sulfide (FeS or $FeS_2$), and the separators are formed of a fibrous boron nitride (BN) or a pressed powder magnesium oxide (MgO). An electrolyte such as a lithium chloride and potassium chloride mixture (LiCl-KCl), is normally infiltrated into the electrode materials and into the separators. The positive and negative current collectors are commonly formed of a conductive open mesh-like sheet or plate construction so as to confine the electrode materials while also allowing the migration of the electrolyte as required relative to the confined electrode materials. Existing commercially fabricated full size batteries of this type are comprised of many cells, each having the construction noted above, that are housed together in a common battery housing and that are electrically connected in series to produce higher effective voltage output.

This type of battery or cell is designed to operate at temperatures in the range of 425°–500° C. The electrode materials and electrolyte are most corrosive at these temperatures so that the current collectors must be of corrosive resistant yet electrically conductive material. Some success has been obtained by using stainless steel clad over copper. Moreover, the battery is designed to have an operating life in excess of 1000 "deep discharge" cycles, where each "deep discharge" cycle means discharging the fully charged battery down to approximately only a 20% charge level before recharging it again. During this deep discharge cycling, the positive and negative electrode materials undergo volumetric changes at different rates. This can shift the physically confining respective current collectors relative to one another within the battery cell or can even deform the collectors and/or cell housing. Also, nonuse of this type battery allows the operating temperatures of the electrolyte and electrode materials (each a paste-like liquid at the operating temperatures) to drop to temperatures whereat they can freeze solid. These freeze-thaw cycles can also cause movement between the current collectors, electrode materials and cell housing.

Although the shifting movement or the deformation may only be minor, it can be sufficient to cause a short in the battery, particularly over an extended number of cycles. This results in a decline in the coulombic efficiency, and a battery might be considered marginal when its coulombic efficiency is reduced to 95%.

The most common source of a cell short is the direct contact of the current collectors with one another. Another common cause of a cell short is where one electrode material oozes from its constraints and bridges to the opposite electrode material. Another form of cell short occurs where the positive electrode material "swells" out more than the negative electrode material to short against the cell housing, which most commonly is at the negative potential. Efforts to reduce these problems by fixturing, etc. the current collectors relative to one another or by reinforcing the cell housing by external constraints have to date only been marginally successful.

Another major problem in existing battery designs has been the number of separate structural plates that must be used in the cell to form the current collectors, and the number of separators that must likewise be used. These structural components generally must be sequentially fixtured in place relative to one another to define the sandwiched assembly. This piece-work fabrication requires extreme accuracy and care. Moreover, pretesting of these stacked plates and separators for possible shorts prior to positioning them within the cell housing is difficult, or meaningless, inasmuch as they yet could be shifted before ending up in the cell housing. The active electrode materials frequently are assembled simultaneously with the structural components being assembled, even though the presence of these chemical components made the fabrication more difficult, time consuming, costly and unreliable.

SUMMARY OF THE INVENTION

This invention relates to a lithium alloy/iron sulfide cell or battery, and specifically teaches an improved cell design and a method of assembling same.

A basic object of the invention is to provide a lithium alloy/iron sulfide cell construction that can be fabricated at room temperatures and with only moderate care in fixturing the structural components and/or in adding the electrode materials and/or electrolyte.

Another object of this invention is to provide a lithium alloy/iron sulfide cell design having separate structural current collector components that are grouped together as different subassemblies and then fitted into and secured within a cell housing, whereby the arranged structural components can be pretested for shorts or the like prior to the electrode materials and/or the electrolyte being added to the cell and the cell being closed and sealed.

A more detailed object of this invention is to provide a lithium alloy/iron sulfide cell having an open-ended cell housing having positive and negative electrode subassemblies that are nested within one another (the positive subassembly being located outwardly of the negative subassembly) and separator structure sandwiched between the subassemblies electrically insulating them from one another, and the subassemblies being fitted into the cell housing and defining cavities open respectively to the opposite open ends of the cell housing.

Another object of this invention is to provide a cell housing design that is partitioned by an intermediate highly conductive cross wall so as to define thereby cell cavities on opposite sides of the cross wall. This cell design allows the positive electrode material to be located between the cell housing and the positive electrode current collector subassembly, providing thereby that any charge-discharge cycle swelling will be inwardly against both the positive and the negative electrode subassemblies and/or outwardly against the cell housing. The cross wall structurally reinforce the cell housing, and further serves as a current collector for the adjacent positive subassemblies in the adjacent cavities. This provides in essence that the cells are self-restraining and therefore minimizes the need for external housing constraints or the likelihood of internally shorting out.

Another object of this invention is to provide a cell design whereby the structural current collectors can first be positioned and secured in place in the housing, and also a method then of filling electrode materials into the cell housing by the extrusion thereof into chambers defined by the structural components and via open opposite ends of the cell housing.

Another object of this invention is to provide a lithium alloy/iron sulfide cell design that is light in weight as compared to the electrical output, whereby a high specific energy cell is achieved.

The invention specifically provides for a cell housing that is open-ended during the fabrication of the cell, and for separate negative and positive current collector subassemblies that can be fitted together as a composite structure and can then be fitted and secured in place in the housing. Further the positive and negative subassemblies as arranged in the cell housing define open-ended chambers into which fill nozzles can be inserted, preferably from the opposite open ends of the housing, whereby each of the positive and negative electrode materials can then be injected from these fill nozzles as a slurry into the respective chambers and proximate its current collector subassembly, and whereby the chambers can be closed and sealed to form the cell.

DETAILED DESCRIPTION OF THE INVENTION

Figure 1:
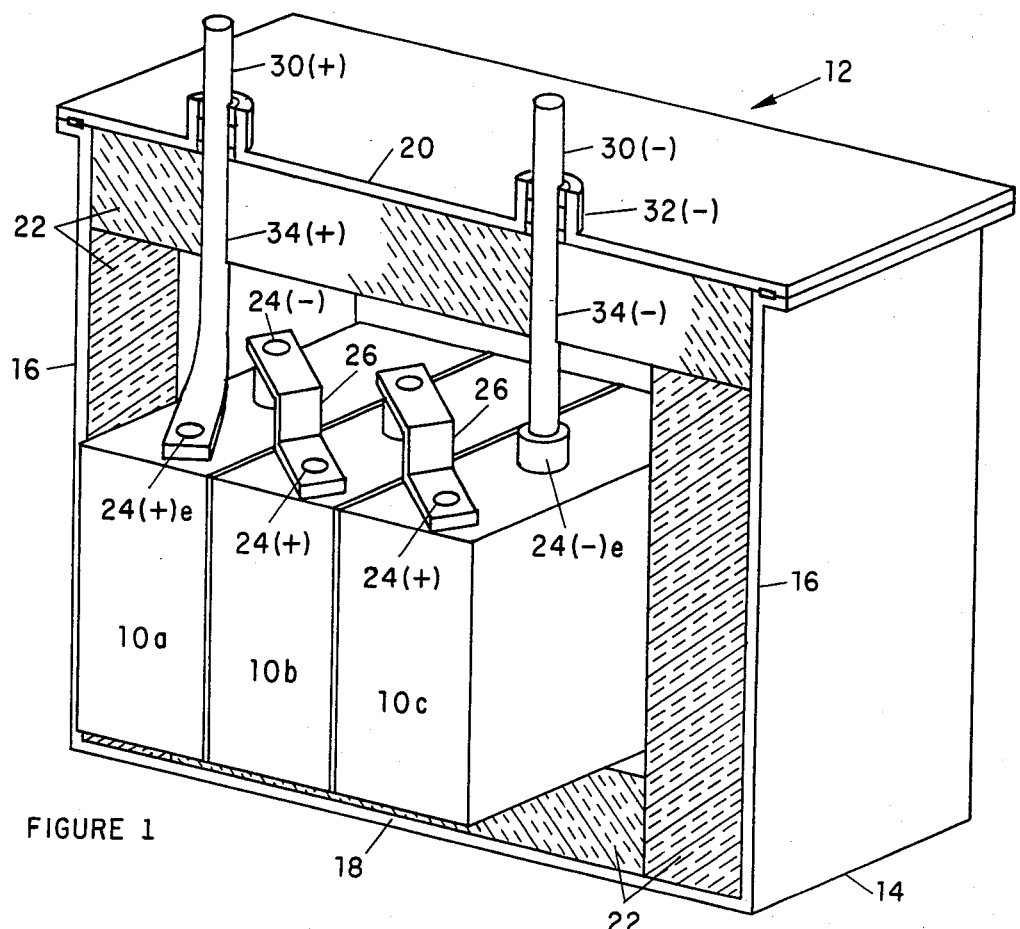
FIG. 1 is a perspective view, partially broken away and in section for clarity of disclosure, showing a battery having several cells for which this invention forms an improvement.

This invention teaches a new design for and method of forming a cell 10 for a lithium alloy/metal sulfide battery 12. The specific battery 12 illustrated in FIG. 1 includes an exterior sealed housing 14 having opposed pairs of side walls 16, a bottom wall 18, and a removable top wall 20 adapted to be secured in place against a peripheral flange at the top of the side walls. A plurality of the individual cells 10a, 10b, 10c, etc., are stacked side-by-side within the housing 14. Inasmuch as the cell operates in the range of 425°–500° C., insulation 22 is located between the battery housing 14 and cells 10 to hold the exterior face of the housing to a reasonably safe temperature to the touch, for example, less than 100° C. Additional insulation (not shown) can be added to the exterior of the housing to lower the exposed surface temperatures even more, if required, depending on the end-use location of the battery. External positive and negative terminals 24(+) and 24(−) are provided on each of the cells, and conductive straps 26 serially connect the (+) and (−) terminals 24 of adjacent cells 10 together to give a cumulative battery voltage. Exterior positive and negative battery terminals 30(+) and 30(−) are provided on the housing 14, at least one of which extends through the housing wall via an insulated passthrough connection 32(−); and flexible conductors 34(+) and 34(−) connect the terminals 24(+)e and 24(−)e of the end cells to these battery terminals 30.

Figure 2:
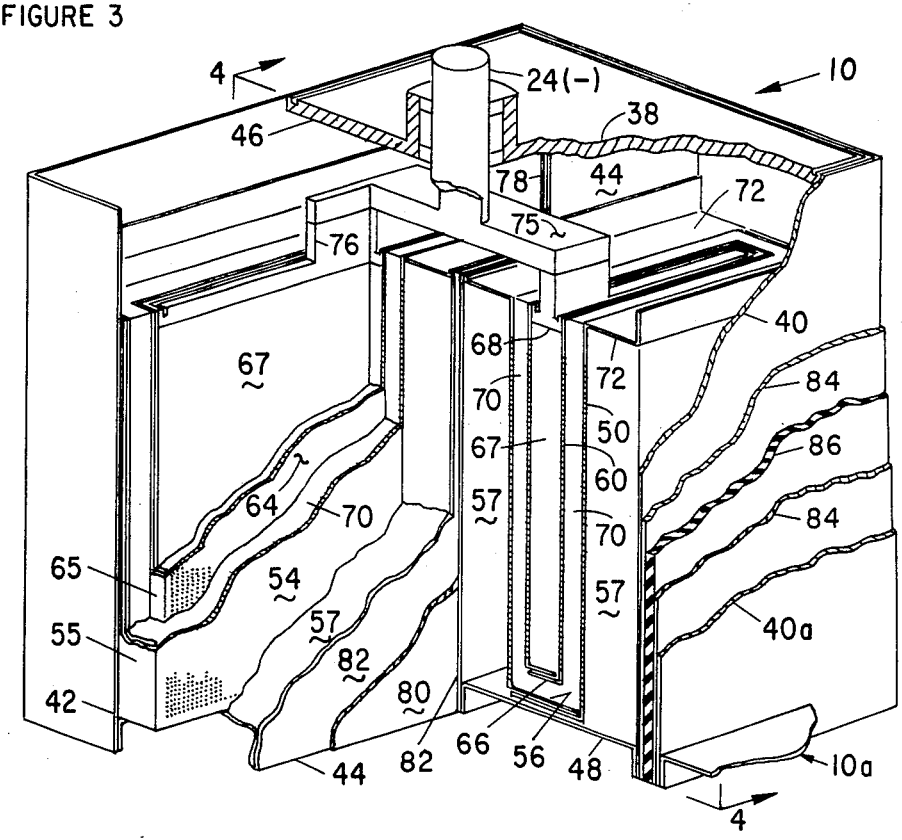
FIG. 2 is a perspective view, again partially broken away and in section for clarity of disclosure, showing an individual cell used in the battery of FIG. 1, but being to a larger scale than FIG. 1.

Referring to the FIG. 2, an enlarged view is illustrated of the improved cell 10 used in the battery 12. The cell 10 has a sealed exterior case 38 preferably shaped as a rectangular cube elongated across one width dimension, thus having opposed long side walls 40 and opposed short side walls 42. A preferred cell size might be of the order of 15–20 cms high by 10–15 cms wide by 4–6 cms thick. A cross wall 44 is connected between the short side walls 42 and extended parallel to the long side walls, thus dividing the case into two like cavities. The construction of the case 38 to this point is thus open-ended, and caps or closures 46 and 48 are welded to the side and cross walls to close the open ends of the case.

A positive electrode or current collector subassembly 50 having a cross section as an endless loop is housed within each cavity; a negative electrode or current collector subassembly 60 also having a cross section as an endless loop is fitted within the positive electrode subassembly 50 (there being radial clearance completely around and between the positive and negative electrode subassemblies), and separators 70 are disposed in this clearance space between the subassemblies. In a preferred embodiment, each positive electrode subassembly is secured via top wall 72 directly to the case side and cross walls to define a positive (+) grounded cell construction. The separators 70 electrically insulate the electrode subassemblies from one another, and also support the negative electrode subassembly relative to the positive electrode subassembly and/or housing.

As illustrated, the positive and negative electrode subassemblies (50 and 60) have spaced major faces (54 and 64) and spaced side and bottom minor faces (55 and 65) and (56 and 66) disposed transverse thereto. Positive electrode material 57 is located in the two side chambers defined within the cell between the respective long and cross cell walls and the major faces of the positive electrode subassembly, and possibly also in the smaller chambers between the short cell walls and the minor faces of the positive electrode subassembly. These chambers are open toward the cell case bottom (which as noted will be open when the closure cap 48 is not in place). Further, negative electrode material 67 is located in the single chamber defined within the negative subassembly 60, which chamber is open toward the cell case top (again which will be open when the closure caps 46 and 68 are not in place). The negative electrode subassembly top wall or cap 68 is welded or otherwise sealed to the top of the negative electrode subassembly to seal in the negative electrode material 67; and the bottom closure caps 48 are welded to the cell walls 40, 42 and 44 to seal the positive electrode material within the case proximate the positive electrode subassembly, and the top cap 46 is welded to the cell walls to seal the cell cavity in general.

Each of the positive and negative subassemblies 50 and 60 is formed from two structural sheet components 51 and 61, respectively. Each of the sheet components 51 and 61 has the major face 54 and 64 previously mentioned and short side and bottom flanges 52 and 53 formed transverse thereto. The side and bottom flanges 52 and 53 of each positive sheet component 51 are telescoped into overlapping relationship relative to one another, as are the side and bottom flanges 62 and 63 of the negative sheet components 61; whereby they together define the minor side faces 55 and 65 and minor bottom face 66 and 56 of the positive and negative current collector assemblies. Also, the positive sheet component 51 has a top wall flange 72 disposed normal to the major face 54 but in the opposite direction as the side and bottom flanges 52 and 53; and an edge flange section 73 formed normal to the top wall flange 72 and parallel to the major face 54. The edge flange section 73 is designed to be butted against the inside of the cell housing wall (side wall 40 or cross wall 44) and be welded with a continuous liquid-tight seam weld to the wall. The major wall sections 54 and 64 of these sheets components are perforated; and optionally the overlapping side and bottom flanges 52, 53, 62 and 63 can be perforated. In a preferred design, each of the positive and negative electrode subassembly sheet components 51 and 61 is formed of a steel sheet in the range of 5 and 25 mil thickness, for example.

With respect as to how the cell might be assembled, the negative electrode subassembly is first telescoped together, it is then positioned in one side sheet component of the positive electrode subassembly, sandwiching therebetween a pad of conventional BN or MgO separators positioned over the major and minor faces; additional separators are positioned over the yet exposed major and minor faces of the negative electrode subassembly; and the other side sheet component of the positive electrode subassembly is then positioned over the separator with the flanges of the positive electrode subassembly components telescoped together. The positive and negative electrode assemblies are yet spaced apart and have the separators positioned therebetween whereby the structural subassembly components are electrically insulated from one another. The positive electrode subassembly holding the negative electrode subassembly therewithin is positioned then in the housing, whereby the top wall flanges extend over to the adjacent housing walls and can be welded thereto. The major faces of the positive electrode assembly are yet well spaced from the long housing walls and defines two cavities open toward the bottom end of the cell housing; while the negative electrode subassembly defines a cavity open toward the upper end of the cell housing.

It is contemplated that the continuity checks across the positive and negative electrode subassemblies can now be made to ensure that the components are properly isolated electrically from one another. As noted, each positive electrode subassembly 50 is electrically common to the case 12.

Figure 4:
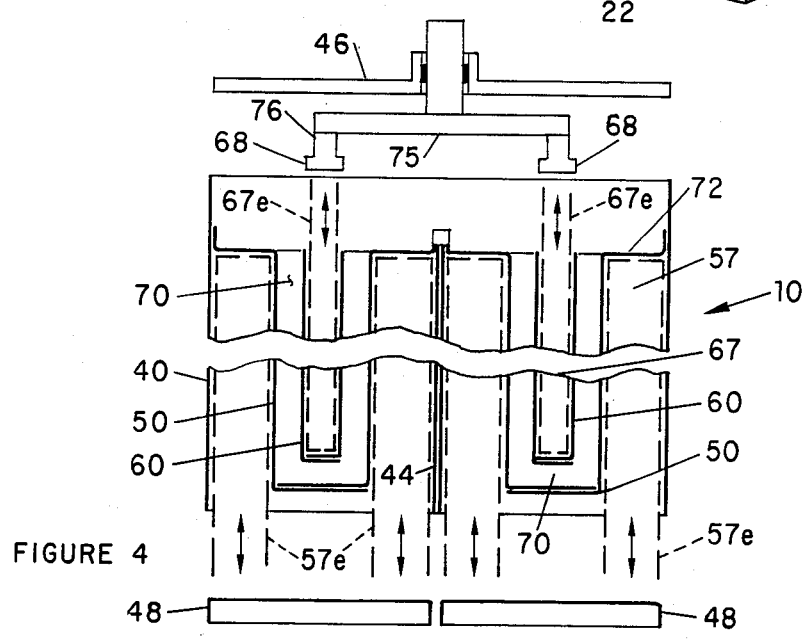
FIG. 4 is a sectional view, as seen in the direction of the arrows generally from the plane 4—4 in FIG. 2, except showing the cell in a preassembled condition and how it can be filled with electrode material according to the method taught with this invention.

In the preferred embodiment, the electrode materials 57 and 67 are extruded into each respective chambers by opposing fill nozzles or extruders 57e and 67e (shown only in phantom in FIG. 4) that can be initially fitted all the way into the chambers and then withdrawn from the chamber as the extruded electrode material fills the chamber. This extrusion can be done following the teachings of my U.S. Pat. No. 4,386,019, at room temperatures using appropriate solvents and with suitable pressures or alternatively at elevated temperatures using molten salts. The extruded electrode material is sufficiently flexible to fill the confining chamber completely, but the electrode material would not be injected with such pressures so as to flow through the perforations of the confining current collector or through the separators. Nonetheless, the electrode material can be made to have sufficient pastiness to stay proximate the adjacent current collector subassembly even without and before sealing the caps 48 and 68 in place. The positive and negative electrode materials can be extruded simultaneously with, or sequentially, of one another. After the respective positive and negative electrode material completely fills its chamber, the chamber is closed and sealed. Thus the lower end closure cap 48 is welded to the case to close the lower open ends of the case, and caps 68 would be welded to the negative electrode assembly walls to seal in the negative electrode material. These welds are continuous to form a seal effectively between the closure cap and the case or current collector assembly. A negative terminal bridge 75 is welded to tabs 76 upstanding from the negative end caps 68 to connect the two adjacent negative electrodes in the common case 38 together electrically. The intermediate wall 44 of the cell housing and the edge flange 73 of the adjacent collector sheet desirably would be notched as at 78 and 79 to allow this. The top closure cap 46 can also now be welded to the top of the housing 14.

Electrolyte is in the cell cavity, commonly being filled via a fill tube (not shown) through the cell case 38 and which is then sealed closed. The electrolyte migrates freely within the cavity, via the separators, at 450° C. aided by gravity and by vacuum to be present in the separators 70 and both the positive and negative electrode materials 57 and 67. It is possible if the electrode materials have been extruded at elevated temperatures with molten salt electrolyte that no additional electrolyte need be added.

As the housing serves as the positive current collector, it must have good conductivity. Thus, the intermediate cross wall 44 preferably is formed of copper sheet 80 that is cladded on each of its opposite major faces with a layer 82 of stainless steel; whereas the remaining housing walls can be formed of stainless steel.

Also, as shown in FIG. 2, copper plates 84 and 84a are positioned adjacent the outside of each major housing wall 40 and 40a to aid conductivity of the housing serving as the positive electrode, where many cell housings are stacked together across the major housing wall and fitted in a single insulated structural battery case. Appropriate insulation 86 is positioned between the copper plates 84 ansd 84a to keep the housings of adjacent cells 10 and 10a separated electrically.

Figure 3:
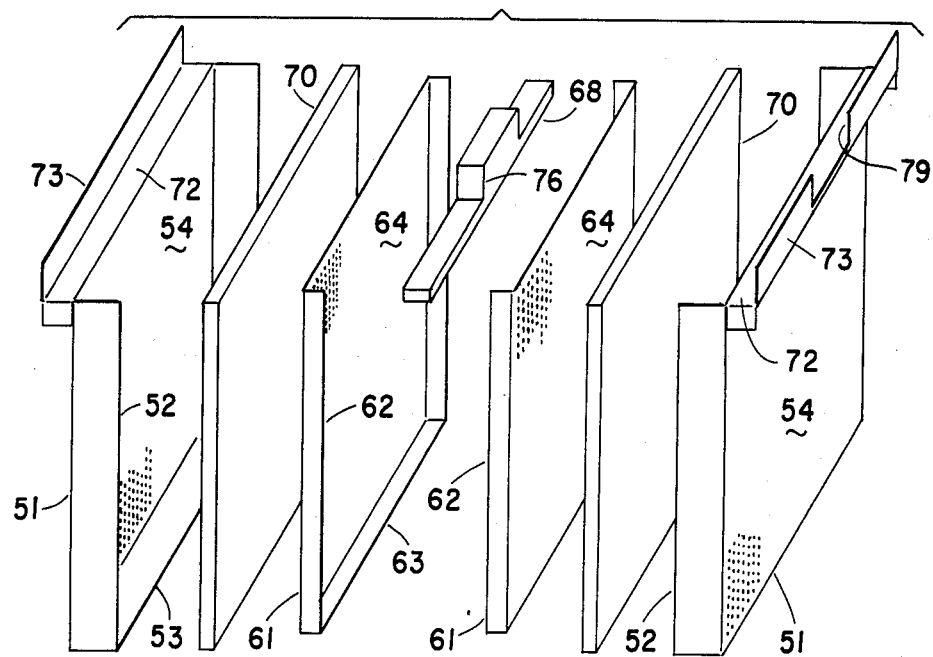
FIG. 3 is a perspective view in exploded preassembled condition, of some of the current collector components used to form the cell of FIG. 2.
Figures 5, 6:
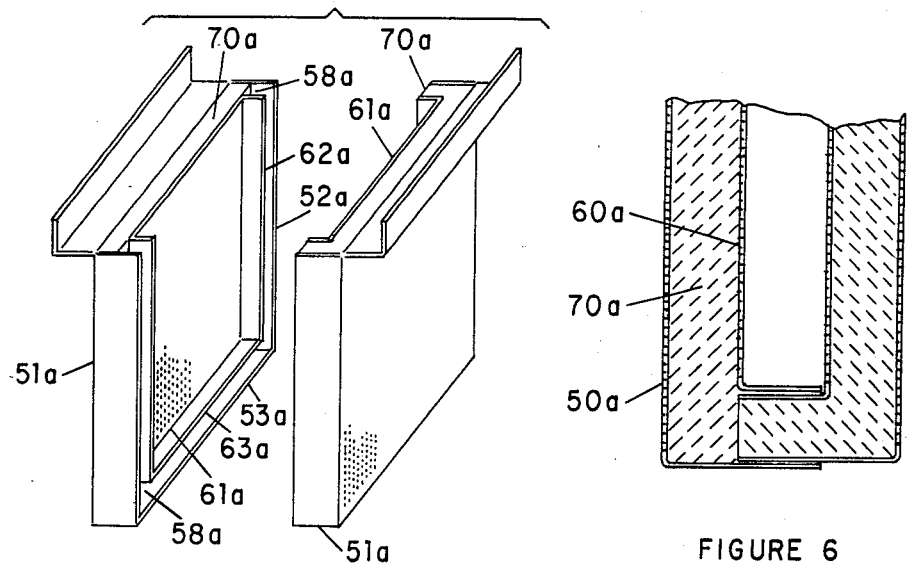
FIG. 5 is an exploded perspective view, similar to FIG. 3, except showing a modification of this invention.
FIG. 6 is a sectional view, as seen in the direction generally from plane 6—6 in FIG. 5, except showing the components in an assembled position as they would be in the cell of FIG. 2.

FIGS. 5 and 6 illustrate a second embodiment of this invention that has great potential appeal in the manufacturing of this type cell. In this embodiment, the physical sheet components 51a and 61a are very similar to the corresponding components 51 and 61 previously disclosed with respect to FIG. 3. However, the separator 70a is not in the conventional physical pad form, but instead initially is in the form of a tape casting or slurry that is layered or doctored between the sheet components. In this regard, the separator 70a is made as a tape casting or as a slurry by the addition of appropriate solvent, according to U.S. Pat. No. 4,411,968 issued Oct. 28, 1983 to Reiser et al. and entitled "Molten Carbonate Fuel Cell Integral Matrix Tape and Bubble Barrier". Thereafter, if a tape casting, the separator 70a as the thin layer is positioned between the separate sheet components 51a and 61a much in the same manner as described with respect to FIG. 3. If a slurry, the separate sheet components 51a and 61a are properly spaced apart with a fixture (not shown) and the separator 70a as a slurry is doctored through the perforations in one of the sheet components to fill the space between these sheet components. In both situations, with a tape cast separator and with a slurry separator, the sheet components 51a and 61a with the sandwiched separator 70a is then cured at an elevated temperature of the order of 1000°–1400° C. for a duration of 2–8 hours whereupon the separator solidifies and intrically bonds itself on its opposite faces to the adjacent electrode component sheets 51a and 61a. This defines a unitary half assembly 59a consisting of one each of the spaced sheet components 51a and 61a substantially adhered relative to one another across the now solid separator 70a, and two half assemblies are used to form each cell.

The side and bottom flanges (52a, 53a and 62a, 63a) of the unitary half assemblies 59a are telescoped relative to another (as illustrated in FIG. 6) but to avoid interference with the solid separator 70a positioned therebetween, the separator 70a on one unitary half assembly is eliminated at the edge (as at 58a). Additional mat type separator material (not shown) might be positioned in this region with expectation that it would yield mechanically somewhat while otherwise completely filling the separator space between the defined adjacent positive and negative electrode subassemblies 50a and 60a. The unitary half assemblies are mounted in place in the cell housing with the top flange wall 72a of the positive electrode sheet component being secured to the case wall. As only the positive electrode subassembly 50a is physically connected relative to the cell housing, the negative electrode subassembly 60a can be shifted somewhat relative hereto or to the cell housing to minimize the effects of oozing of the positive electrode material and/or physical deflection of the electrodes relative to one another in such a manner that shorts can occur therebetween or between the case housing.

One advantage of the open-ended cell housing is that all electrode components can be mechanicaly assembled without any electrode material in place. These fabrication steps can be done at room temperature and with no specific care or accuracy required. Also, preassembly of the negative electrode subassembly within the positive electrode subassembly, electrically insulated therefrom by the separator, allows testing of these subassemblies prior to being fitted into the housing and/or afterwards but prior to filing the cell with the electrode materials. The extrusion-filling of the electrode materials allows for an automated assembly-line setup, well suited for mass production of such cells.

The intermediate cross wall 44 of the housing strengthens the cell to minimize damaging effects of swelling upon battery charging and discharging. Also, the negative electrode assembly is somewhat free to float, so that with the separator positioned completely around it, there is little likelihood of shorting between the negative and positive electrode assemblies. As the positive electrode material is confined by the cell housing walls, it can ooze between these walls and the positive electrode assembly, and since it has a volumetric increase greater than the negative electrode material that heretofore has created the swelling problem, any force differential is exerted inwardly from the reinforced housing cell walls directly against the positive electrode or current collector subassembly and only indirectly against the negative electrode subassembly.

This cell housing configuration provides an energy-to-weight ratio or specific energy value almost 30% better than conventional cells not having the reinforcing intermediate or cross wall and the resulting dual cavity construction. Despite this, there is also lower internal cell electrical resistance for greater sustained power output. The openended housing arrangement appears well suited for assembly line production, at room temperature, and where the electrode subassemblies can be pretested for shorts before the electrode material has been extruded in place and the cell housing is sealed closed.

The embodiments of the invention in which an exclusive property or privilege is claimed are defined as follows:

1. A lithium alloy/iron sulfide cell or battery, comprising an exterior housing, positive and negative current collector subassemblies disposed in the housing and having spaced mutually paired perforated faces, means securing the positive current collector subassembly to the housing operable to hold its major faces spaced from the housing, positive electrode material confined between the housing and the perforated faces of the positive electrode subassembly and means to seal the positive electrode material therein, separator means disposed between the positive and negative current collector subassemblies for electrically insulating them from one another and also supporting the negative current collector subassembly within and relative to the positive current collector subassembly, negative electrode material confined within the negative electrode subassembly and means to seal the negative electrode materials therein, and means to seal the housing.

2. A lithium alloy/iron sulfide cell or battery according to claim 1, further including said positive and negative current collectors subassemblies having respective wall structures extended as continuous spaced loops, and the negative current collector subassembly loop being disposed within the positive current collector subassembly loop and separated therefrom by the separator means.

3. A lithium alloy/iron sulfide cell or battery according to claim 2, further including the wall structures of the positive current collector subassembly loop being spaced from the housing and the positive electrode material being between the wall structures and the housing.

4. A lithium alloy/iron sulfide cell or battery according to claim 2, further including the wall structures of the negative current collector subassembly loop defining an opening at one end, and the negative electrode material being confined adjacent the negative current collector subassembly wall structures up to the open end thereof.

5. A lithium alloy/iron sulfide cell or battery according to claim 4, further including cap means secured to the negative current collector subassembly wall structures at the open end thereof operable to seal the negative electrode material within the negative current collector subassembly.

6. A lithium alloy/iron sulfide cell or battery according to claim 2, further including the wall structures of the positive and negative current collector subassembly loops each having at least one region of major perforated faces and having at least one region of telescoped and lapped flanges angled transversely to the major faces thereof.

7. A lithium alloy/iron sulfide cell or battery according to claim 1, further including the separator means being in the form of a pad-like mass of material loosely positioned adjacent and between the positive and negative current collector subassemblies.

8. A lithium alloy/iron sulfide cell or battery according to claim 1, further including the separator means being in the form of a solid mass of material bonded to and between the positive and negative currrent collector subassemblies.

9. A lithium alloy/iron sulfide cell or battery according to claim 1, further including having said housing formed with a pair of long side walls and a pair of short side walls and a cross wall extended parallel to the long side walls and connected to the short side walls and thereby defining a pair of cavities, and a positive and negative subassembly disposed in each cavity.

10. A lithium alloy/iron sulfide cell or battery according to claim 9, further including said cross wall being formed of a copper sheet clad with stainless steel on its opposite faces.

11. A lithium alloy/iron sulfide cell or battery according to claim 9, further including a bridge terminal connected to and between the negative current collector subassemblies of the adjacent cavities electrically connecting them together.

* * * * *